United States Patent
Yang

(10) Patent No.: US 11,307,449 B2
(45) Date of Patent: Apr. 19, 2022

(54) DISPLAY PANEL, MANUFACTURING METHOD AND DISPLAY DEVICE

(71) Applicant: HKC CORPORATION LIMITED, Shenzhen (CN)

(72) Inventor: Chunhui Yang, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 634 days.

(21) Appl. No.: 16/319,485

(22) PCT Filed: Dec. 4, 2018

(86) PCT No.: PCT/CN2018/119077
§ 371 (c)(1),
(2) Date: Jan. 22, 2019

(87) PCT Pub. No.: WO2020/107503
PCT Pub. Date: Jun. 4, 2020

(65) Prior Publication Data
US 2021/0333622 A1  Oct. 28, 2021

(30) Foreign Application Priority Data
Nov. 26, 2018 (CN) .......................... 201821960017.1

(51) Int. Cl.
*G02F 1/1335* (2006.01)
(52) U.S. Cl.
CPC .. *G02F 1/133516* (2013.01); *G02F 1/133512* (2013.01)
(58) Field of Classification Search
None
See application file for complete search history.

(56) References Cited

U.S. PATENT DOCUMENTS

2004/0201815 A1* 10/2004 Yamamoto .......... G02F 1/13394
349/156
2005/0206812 A1* 9/2005 Tsubata ............... G02F 1/13394
349/107

(Continued)

FOREIGN PATENT DOCUMENTS

CN        1497299 A    5/2004
CN      103353693 A   10/2013

(Continued)

OTHER PUBLICATIONS

Jiajia Chen, the ISA written comments, Jun. 2019, CN.

*Primary Examiner* — Ryan Crockett

(57) ABSTRACT

The present application discloses a display panel, a manufacturing method and a display device. The display panel comprises: a color photoresist layer, formed on the substrate, and comprising three types of parallelly disposed first color filter, second color filter and third color filter in different heights; a support pillar, disposed on the color photoresist layer, and comprising a main support pillar disposed on the first color filter; a first auxiliary support pillar, disposed on the second color filter; and a second auxiliary support pillar, disposed on the third color filter. A height difference between the main support pillar and the first auxiliary support pillar is a first section difference; and a height difference between the main support pillar and the second auxiliary support pillar is a second section difference, wherein the first section difference is the same as the second section difference.

11 Claims, 6 Drawing Sheets

(56) References Cited

U.S. PATENT DOCUMENTS

| | | | | |
|---|---|---|---|---|
| 2006/0203177 | A1* | 9/2006 | Cho | G02F 1/13394 349/155 |
| 2009/0273747 | A1* | 11/2009 | Shin | G02F 1/13394 349/107 |
| 2011/0299002 | A1* | 12/2011 | Won | G02F 1/13394 349/43 |
| 2012/0057111 | A1* | 3/2012 | Oh | G02F 1/133514 349/106 |

FOREIGN PATENT DOCUMENTS

| | | |
|---|---|---|
| CN | 203337948 U | 12/2013 |
| CN | 105527744 A | 4/2016 |
| CN | 106371243 A | 2/2017 |

\* cited by examiner

DISPLAY PANEL, MANUFACTURING METHOD AND DISPLAY DEVICE

The present application claims priority to the Chinese Patent Application No. CN201821960017.1, filed with the National Intellectual Property Administration on Nov. 26, 2018, and entitled "DISPLAY PANEL, MANUFACTURING METHOD AND DISPLAY DEVICE", which is incorporated herein by reference in its entirety.

TECHNICAL FIELD

The present application relates to the technical field of display and in particular to a display panel, a manufacturing method and a display device.

BACKGROUND

It should be understood that the description herein only provides background information related to the present application, and not intended to form the prior art necessarily.

Along with the development and the improvement of science and technologies, Liquid crystal displays have the numerous advantages of thin machine body, power saving, no radiation and the like, and are extensively applied. Most of the liquid crystal displays in the market are a backlight liquid crystal display, and the backlight liquid crystal display includes a liquid crystal panel and a backlight module. The liquid crystal panel includes a color filter substrate (CF Substrate), and a thin film transistor substrate (TFT Substrate), a transparent electrode exists in an opposite inner side of the above substrate. A layer of liquid crystal (LC) is clamped between two pieces of the substrates.

In order to perfectly reproduce a color, film thicknesses of color filters are different. In a practical substrate manufacturing process, a first section difference of a support column is different from a second section difference, and it is not beneficial to a lower limit of a liquid crystal edge, namely an amount of the liquid crystal at a boundary of a vacuum bubble is increased, and the liquid crystal edge is decreased. It is not beneficial to manufacturing process production.

SUMMARY

The present application provides a display panel, a manufacturing method and a display device, and is convenient for a manufacturing process.

In order to achieve the above purpose, the present application provides a display panel, including: a substrate, a color photoresist layer and a support pillar; the color photoresist layer is formed on the substrate, and the color photoresist layer includes three types of parallelly disposed first color filter, second color filter and third color filter in different heights; the support pillar is disposed on the color photoresist layer, and the support pillar includes: a main support pillar, disposed on the first color filter; a first auxiliary support pillar, disposed on the second color filter; and a second auxiliary support pillar, disposed on the third color filter, where a height difference between the main support pillar and the first auxiliary support pillar is a first section difference; a height difference between the main support pillar and the second auxiliary support pillar is a second section difference; and the first section difference is the same as the second section difference.

Optionally, the third color filter is provided with a lug boss, the second auxiliary support pillar is disposed on the lug boss, and a height of the second auxiliary support pillar is the same as a height of the first auxiliary support pillar.

Optionally, the second color filter is provided with a groove, the first auxiliary support pillar is disposed in the groove, and the height of the first auxiliary support pillar is the same as the height of the second auxiliary support pillar.

Optionally, the height of the second auxiliary support pillar is different from the height of the first auxiliary support pillar, and surfaces of the second color filter and the third color filter are smooth.

Optionally, the height of the first auxiliary support pillar is reduced, the heights of the second color filter and the third color filter are different, and the surfaces of the second color filter and the third color filter are smooth.

Optionally, the height of the second auxiliary support pillar is increased, the heights of the second color filter and the third color filter are different, and the surfaces of the second color filter and the third color filter are smooth.

Optionally, the substrate further includes a substratum, a black matrix layer, a color photoresist layer and a transparent electrode layer, the black matrix layer is formed on the substratum; the color photoresist layer is formed on the black matrix layer; and the transparent electrode layer is configured to cover the support pillar and the color photoresist layer.

Optionally, the substrate includes a color film substrate.

Optionally, the first color filter is a red filter, the second color filter is a green filter, and the third color filter is a blue filter.

Optionally, the lug boss surface is a plane.

The present application further discloses a display device. The display device includes: a substratum, a black matrix, a color photoresist layer, a support pillar and a transparent electrode layer, the black matrix layer is formed on a glass plate.

The color photoresist layer is formed on the substratum, and the color photoresist layer includes three types of parallelly disposed first color filter, second color filter and third color filter in different heights; the support pillar is disposed on the color photoresist layer; the transparent electrode layer is configured to cover the support pillar and the color photoresist layer; the support pillar includes: a main support pillar, disposed on the first color filter; a first auxiliary support pillar, disposed on the second color filter; and a second auxiliary support pillar, disposed on the third color filter, where a height difference between the main support pillar and the first auxiliary support pillar is a first section difference; a height difference between the main support pillar and the second auxiliary support pillar is a second section difference; and the first section difference is the same as the second section difference; the second color filter is provided with a groove, and the first auxiliary support pillar is disposed in the groove; and a height of the first auxiliary support pillar is the same as a height of the second auxiliary support pillar.

Optionally, the third color filter is provided with a lug boss, the second auxiliary support pillar is disposed on the lug boss, and the height of the second auxiliary support pillar is the same as the height of the first auxiliary support pillar.

Optionally, a shape of the groove is an isosceles trapezoid shape.

The present application further discloses a manufacturing method for a display panel. The manufacturing method for the display panel includes the following steps:

forming a color photoresist layer on a substrate;

forming a support pillar on the color photoresist layer;

where, the color photoresist layer includes three types of parallelly disposed first color filter, second color filter and third color filter in different heights.

The support pillar includes:

a main support pillar, disposed on the first color filter;

a first auxiliary support pillar, disposed on the second color filter; a second auxiliary support pillar, disposed on the third color filter;

a height difference between the main support pillar and the first auxiliary support pillar is a first section difference;

a height difference between the main support pillar and the second auxiliary support pillar is a second section difference; and the first section difference is the same as the second section difference.

Optionally, the step of forming the color photoresist layer on the substrate includes the following steps:

forming a groove on the second color photoresist layer by using a semi-transmitting mask plate;

the step of forming the support pillar on the color photoresist layer includes the following steps:

forming the first auxiliary support pillar on the groove.

A diffraction principle of a semi-transparent film or a graphic slit on the mark plate to ultraviolet light is adopted for reducing a local ultraviolet transmittance, the transmittance of a third color filter area is reduced, and a practical film thickness of the third color filter area is slightly decreased compared with a complete transmitting area, and through the adjustment of manufacturing process parameters, the same section difference may be realized.

Optionally, the step of forming the color photoresist layer on the substrate includes the following steps:

forming the second color filter and the third color filter with the smooth surfaces by using a full-transmitting mask plate.

Optionally, the step of forming the support pillar on the color photoresist layer includes the following steps:

forming the first auxiliary support pillar and the second auxiliary support pillar on the second color filter and the third color filter.

The diffraction principle of the semi-transparent film or the graphic slit on the mark plate to the ultraviolet light is adopted for reducing the local ultraviolet transmittance, the transmittances of a second color filter area and the third color filter area are reduced, and the practical film thicknesses of the second color filter area and the third color filter area are slightly decreased compared with the complete transmitting area, and through the adjustment of the manufacturing process parameters, the same section difference may be realized.

In order to perfectly reproduce the color, the thicknesses of the three color photoresist layers are different, and the heights of the support pillars are the same, so the first section difference is different from the second section difference, namely in a low temperature, only one of the auxiliary support pillars plays a support function, and it is not beneficial to a lower limit of a liquid crystal edge, namely an amount of the liquid crystal at a boundary of a vacuum bubble is increased, and the liquid crystal edge is decreased, it is not beneficial to manufacturing process production, through adjusting the heights of the color photoresist layer and the support pillar on the substrate, the first and second section differences are enabled to be the same, the liquid crystal amount is decreased, and the liquid crystal edge is increased, it is beneficial to the manufacturing process, and a product yield is improved.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts.

In the accompanying drawings.

DETAILED DESCRIPTION

Figure 1:
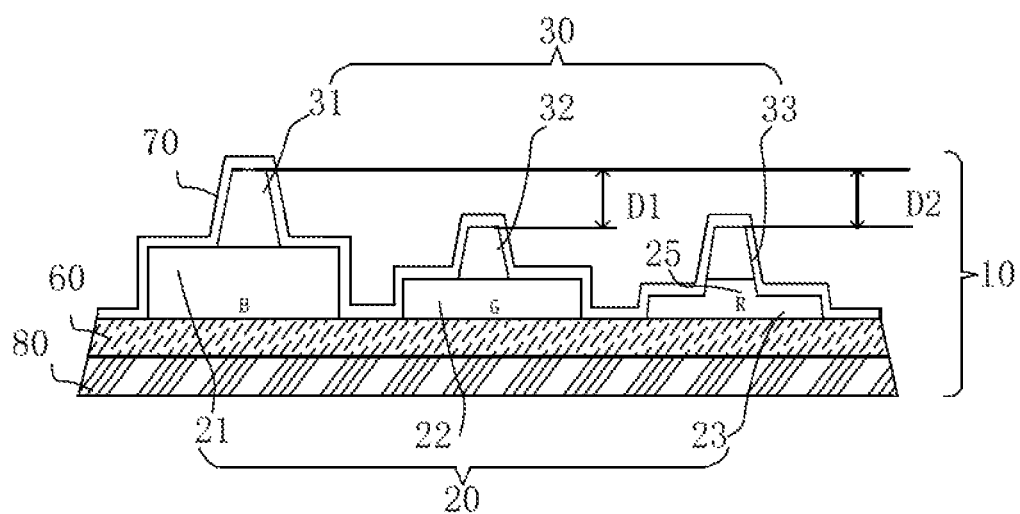
FIG. 1 is a section schematic diagram of a substrate structure of one embodiment of the present application.

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left", "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms such as "first" and "second" are merely for a descriptive purpose, and cannot be understood as indicating or implying relative importance, or implicitly indicating the number of the indicated technical features. Hence, the features defined by "first" and "second" can explicitly or implicitly include one or more features. In the description of the present application, "a plurality of" means two or more, unless otherwise stated. In addition, the term "include" and any variations thereof are intended to cover a non-exclusive inclusion.

In the description of the present application, it should be understood that, unless otherwise specified and defined, the terms "install", "connected with", "connected to" should be comprehended in a broad sense. For example, these terms may be comprehended as being fixedly connected, detachably connected or integrally connected; mechanically connected or coupled; or directly connected or indirectly connected through an intermediate medium, or in an internal communication between two elements. The specific meanings about the foregoing terms in the present application may be understood by those skilled in the art according to specific circumstances. The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, elements and/or components, but do not preclude the presence or addition of one or more other features, integers, steps, operations, elements, components and/or combinations thereof.

An undisclosed technical scheme is used by an applicant. A liquid crystal box is internally provided with two types of support pillars generally: one type is a main support pillar for maintaining a thickness of the liquid crystal box in a normal condition, and the other type is an auxiliary support pillar which plays a support function in a practical substrate manufacturing process under the extrusion of an external force, because of reasons of different red/green/blue wave lengths and perception of human eyes to a color and the like, in order to perfectly reproduce the color, the film thicknesses of the red/green/blue color filters are different. After completing the substrate manufacturing process, a first section difference is different from a second section difference, while a temperature is overhigh, a volume of liquid crystal is expanded, a support force of the main support pillar is reduced, the increased liquid crystal may be locally aggregated together so that display luminance is uneven, the gravity display luminance is defined to be uneven, and an amount of the boundary liquid crystal is a volume (L1), namely in a low temperature, only one of the auxiliary support pillars plays the support function, it is not beneficial to a lower limit of a liquid crystal edge, the amount of the liquid crystal at the boundary of the vacuum bubble is a volume (L2), and the liquid crystal edge is decreased. It is not beneficial to manufacturing process production. The patent is capable of, through an optimal design, enabling the first section difference to be the same as the second section difference, and increasing the liquid crystal edge, and beneficial to the manufacturing process, the yield is improved, situations that the display of a display screen is uneven and a display saturation is not enough do not appear so that the display effect is not good.

The present application is described below in combination with the drawings and embodiments.

A substrate 10 of the present application is described by using a color film substrate as an example.

As shown in FIG. 1 to FIG. 5, the embodiment of the present application discloses a display panel, including:

a substrate 10, a color photoresist layer 20 and a support pillar 30; the color photoresist layer 20 is formed on the substrate 10, and the color photoresist layer 20 includes three types of parallelly disposed first color filter 21, second color filter 22 and third color filter 23 in different heights; the support pillar 30 is disposed on the color photoresist layer 20, and the support pillar 30 includes: a main support pillar 31, disposed on the first color filter 21; a first auxiliary support pillar 32, disposed on the second color filter 22; and a second auxiliary support pillar 33, disposed on the third color filter 23, where a height difference between the main support pillar 31 and the first auxiliary support pillar 32 is a first section difference D1; a height difference between the main support pillar 31 and the second auxiliary support pillar 33 is a second section difference D2; and the first section difference D1 is the same as the second section difference D2.

In the scheme, in order to perfectly reproduce the color, the thicknesses of the three color photoresist layers 20 are different, and the heights of the support pillars 30 are the same, so the first section difference D1 is different from the second section difference D2, namely in a low temperature, only one of the auxiliary support pillars plays a support function, and it is not beneficial to a lower limit of a liquid crystal edge, namely an amount of the liquid crystal at a boundary of a vacuum bubble is increased, and the liquid crystal edge is decreased, it is not beneficial to manufacturing process production, through adjusting the heights of the color photoresist layer 20 and the support pillar 30 on the substrate 10, the first and second section differences D2 are enabled to be the same, the liquid crystal amount is decreased, and the liquid crystal edge is increased, it is beneficial to the manufacturing process.

As shown in FIG. 1, in one or more embodiments, the third color filter 23 is provided with a lug boss 25, the second auxiliary support pillar 33 is disposed on the lug boss 25, and a height of the second auxiliary support pillar 33 is the same as a height of the first auxiliary support pillar 32.

In the scheme, during a manufacturing process, the height of the second auxiliary support pillar 33 is the same as the height of the first auxiliary support pillar 32, so the manufacturing may be simultaneously performed in the same manufacturing process, another manufacturing process is not needed for manufacturing the different support pillars, and the manufacturing process is simple, in order to perfectly reproduce the color, the height of each color photoresist layer 20 is different, the third color filter 23 is provided with the lug boss 25, a material of the lug boss 25 is the same as a material of the third color filter 23, the lug boss 25 and the third color filter 23 are integrally manufactured with the color photoresist layer 20, not only the manufacturing process is saved, but also the overall heights of the third color filter 23 and the second auxiliary support pillar 33 are elevated, a section difference is reduced, and a support function may be achieved in advance, a thickness of a liquid crystal box is more early prevented from being descended, liquid crystal at a boundary is decreased, and a liquid crystal edge is increased.

Figure 2:
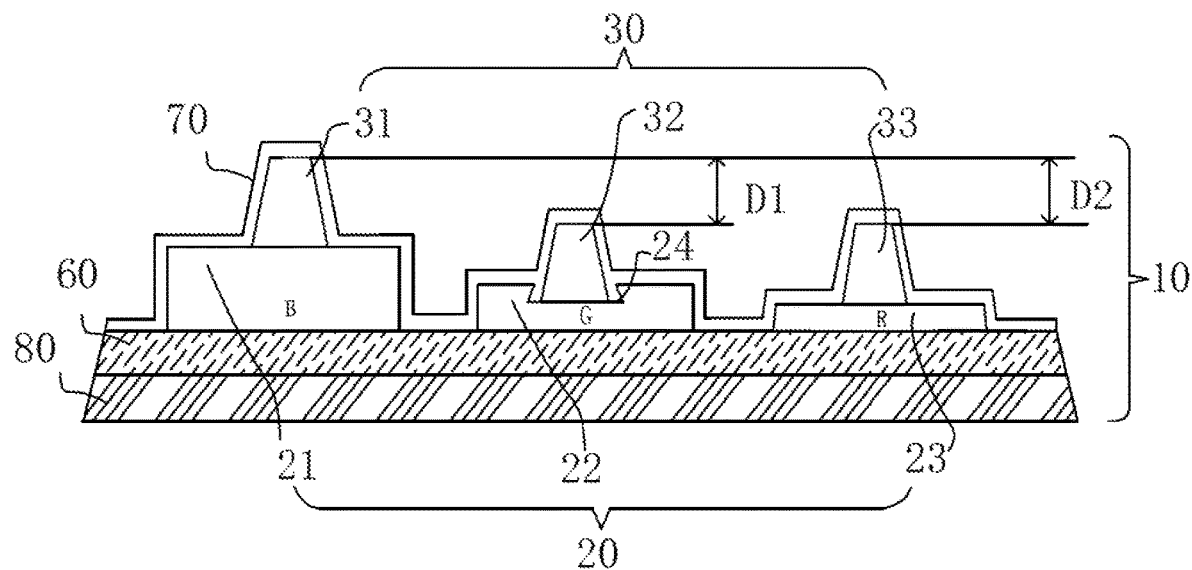
FIG. 2 is a section schematic diagram of a substrate groove structure of one embodiment of the present application.

As shown in FIG. 2, in one or more embodiments, the second color filter 22 is provided with a groove 24, the first auxiliary support pillar 32 is disposed in the groove 24, and the height of the first auxiliary support pillar 32 is the same as the height of the second auxiliary support pillar 33.

In the scheme, during a manufacturing process, the height of the first auxiliary support pillar 32 is the same as the height of the second auxiliary support pillar 33, so the manufacturing may be simultaneously performed in the same manufacturing process, the support pillars are manufactured in the same manufacturing process, and the manufacturing process is simple, the second color filter 22 is provided with the groove 24, the groove 24 is disposed on the surface of the second color filter 22, a material of the groove 24 is the same as a material of the second color filter 22, the groove 24 is integrally manufactured with the second color filter 22, and the manufacturing process is saved, the groove 24 is easy to lock a position, the first auxiliary support pillar 32 is disposed in the groove 24, and the groove 24 is configured to reinforce the first auxiliary support pillar 32.

In one or more embodiments, a height of the second auxiliary support pillar 33 is different from a height of the first auxiliary support pillar 32, and a height of the second color filter 22 is different from a height of the third color filter 23.

In the scheme, a height of the color photoresist layer 20 is not changed as the same as an example, a color saturation is good, a display effect is not changed, and additional compensation is not needed, a height of the first auxiliary support pillar 32 is different from a height of the second auxiliary support pillar 33, and a section difference is reduced, while liquid crystal is shrunk, an amount of the liquid crystal at a boundary of a vacuum bubble is increased, and a liquid crystal edge is decreased, it is beneficial to a manufacturing process.

Figure 3:
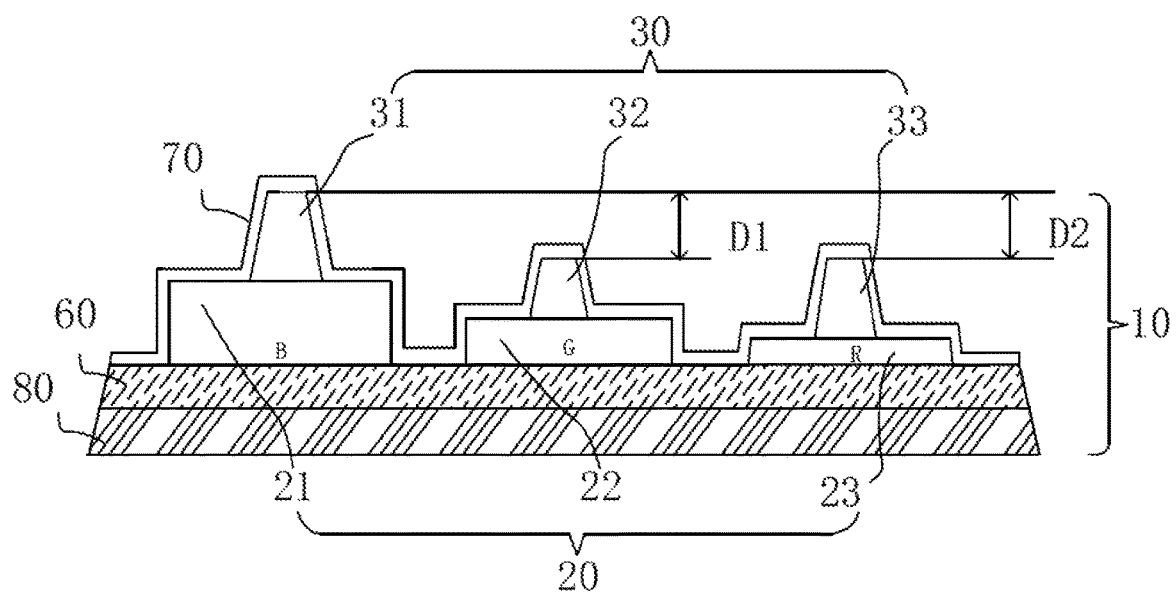
FIG. 3 is a section schematic diagram of a support pillar decreasing structure of one embodiment of the present application.

As shown in FIG. 3, optionally in the embodiment, a height of the first auxiliary support pillar 32 is shortened, a height of the second color filter 22 is different from a height of the third color filter 23, surfaces of the second color filter 22 and the third color filter 23 are smooth.

In the scheme, the color photoresist layer 20 is as the same as an example, and a color saturation is also as the same as the example, a display effect is not changed, and additional compensation is not needed, the height of the first auxiliary support pillar 32 is shortened, manufacturing process time is shortened and a section difference is shortened, the section differences are the same, it is beneficial to a manufacturing process.

Figure 4:
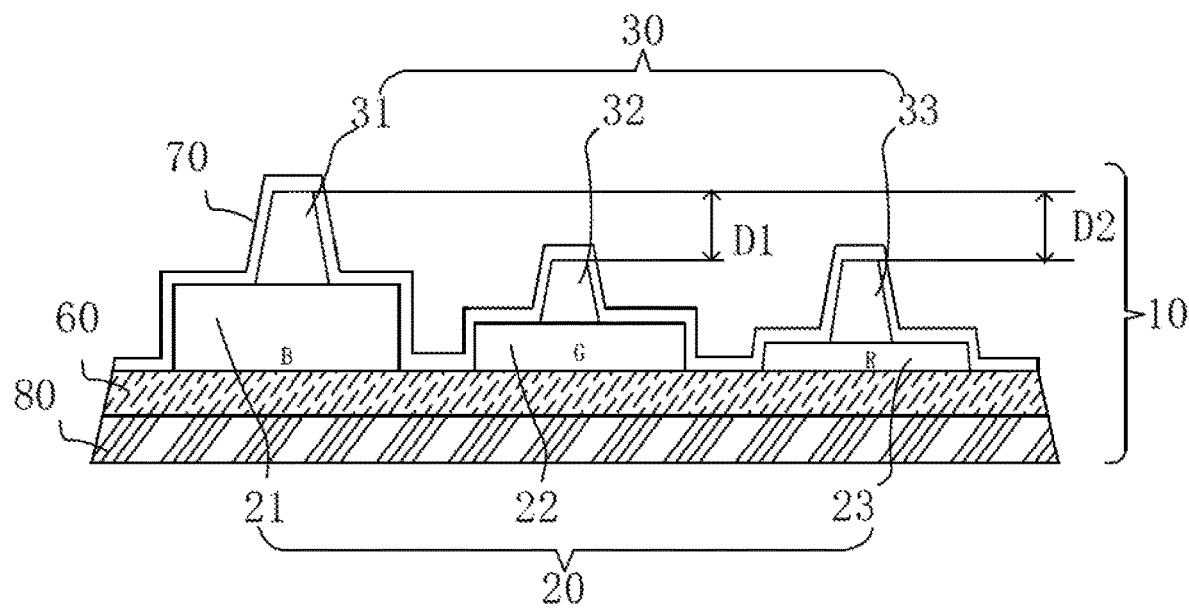
FIG. 4 is a section schematic diagram of a support pillar increasing structure of one embodiment of the present application.
Figure 5:
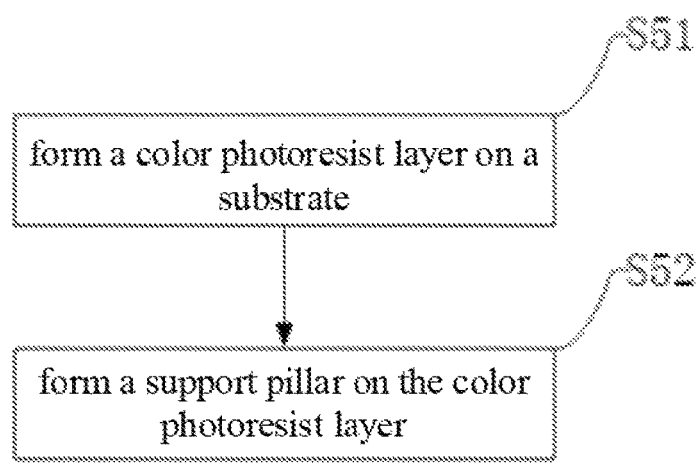
FIG. 5 is a schematic diagram of a substrate method step of one embodiment of the present application.

As shown in FIG. 4, in one or more embodiments, a height of the second auxiliary support pillar 33 is elevated, a height of the second color filter 22 is different from a height of the third color filter 23, and surfaces of the second color filter 22 and the third color filter 23 are smooth.

In the technical scheme, a manufacturing process of the exemplary color photoresist layer 20 does not need to be changed, the same section difference may be realized through the different heights of the first auxiliary support pillar 32 and the second auxiliary support pillar 33, because the color photoresist layer 20 keeps unchanged, a height of the photoresist layer 20 is not changed as the same as the original, a color saturation is good, a display effect is good, additional compensation is not needed, and a section difference is reduced, while a volume of liquid crystal in a vacuum bubble is shrunk, an amount of the liquid crystal is slowly decreased, in the same manufacturing process, the height of the first auxiliary support pillar is increased, and the height is elevated, while the liquid crystal is supported, a deformation quantity of the second auxiliary support pillar is increased, elasticity is reinforced, and the color photoresist layer 20 below may not be directly crushed.

In one or more embodiments, the substrate 10 includes a substratum 80, a black matrix 60 layer, a color photoresist layer 20 and a transparent electrode layer 70; the black matrix 60 layer is formed on the substratum 80; the color photoresist layer 20 is formed on the black matrix 60 layer; and the transparent electrode layer 70 is configured to cover the support pillar 30 and the color photoresist layer 20.

In the scheme, the substrate 10 is a key material for color display, the black matrix 60 layer is formed on the substrate 10, light shading and light leaking are performed through a photomask, in order to perfectly reproduce a color, the color photoresist layer is formed on the black matrix 60 layer, the color photoresist layer 20 includes three types of different first color filter 21, second color filter 22 and third color filter 23, the first color filter 21 is B which is a blue color filter 20, the second color filter 22 is G which is a green color filter 20, and the third color filter 23 is R which is a red color filter 20, the support pillar 30 is formed on the color photoresist layer 20, the support pillar is capable of maintaining a gap between the other substrate 10 and the substrate 10, and improving stability of a liquid crystal box, the main support pillar 31 has a key function of heat-insulating and supporting the gap, the first auxiliary support pillar 32 and the second auxiliary support pillar 33 have an auxiliary support function under the action of external force extrusion, the transparent electrode layer 70 is configured to cover the support pillar and the color photoresist layer 20, so the whole substrate 10 forms an electric field for electric connection, and a signal is transmitted.

In one or more embodiments, the surface of the lug boss 25 is a plane.

In the scheme, the surface of the lug boss 25 is the plane, the support pillar provides the better environment for a manufacturing process, in order to make the manufacturing process stable, an underlay is provided, if the plane is unsmooth, the support pillar of the manufacturing process may be collapsed and slid, and the effective support may not be achieved, and the reliability of a panel is improved.

As another embodiment of the present application, as shown in FIG. 1, a display device is disclosed, and the display device includes a display panel, the display panel includes: a substratum 80, a color photoresist layer 20, a support pillar 30 and a transparent electrode layer 70; the color photoresist layer 20 is formed on the substratum 80, and the color photoresist layer 20 includes three types of a first color filter 21, a second color filter 22 and a third color filter 23 in different heights; the support pillar 30 is disposed on the color photoresist layer 20; the transparent electrode layer 70 is configured to cover the support pillar 30 and the color photoresist layer 20; the support pillar 30 includes: a main support pillar 31, disposed on the first color filter 21; a first auxiliary support pillar 32, disposed on the second color filter 22; and a second auxiliary support pillar 33, disposed on the third color filter 23; where a height difference between the main support pillar 31 and the first auxiliary support pillar 32 is a first section difference D1; a height difference between the main support pillar 31 and the second auxiliary support pillar 33 is a second section difference D2; and the first section difference D1 is the same as the second section difference D2.

The second color filter 22 is provided with a groove 24, the first auxiliary support pillar 32 is disposed in the groove 24, and a height of the first auxiliary support pillar 32 is the same as a height of the second auxiliary support pillar 33.

In the scheme, during a manufacturing process, the height of the first auxiliary support pillar 32 is the same as the height of the second auxiliary support pillar 33, so the manufacturing may be simultaneously performed in the same manufacturing process, another manufacturing process is not needed for manufacturing the different support pillars, and the manufacturing process is simple, the second color filter 22 is provided with the groove 24, the groove 24 is easy to lock a position, the first auxiliary support pillar 32 is disposed in the groove 24, and the groove 24 is configured to reinforce the first auxiliary support pillar 32.

In one or more embodiments, the shape of the groove 24 is an isosceles trapezoid shape.

In the scheme, the groove 24 is a groove 24 in the isosceles trapezoid shape, a contact area with the first auxiliary support pillar 32 is large, adequate surface contact provides good underlay for the shape of the support pillar of the manufacturing process, and the shape of the auxiliary support pillar is an isosceles trapezoid shape too, corresponding to the shape of the main support pillar.

As another embodiment of the present application, as shown in FIG. 1 to FIG. 5, a manufacturing method for a display panel is disclosed. The method includes the following steps:

S51: form a color photoresist layer on a substrate;
S52: form a support pillar on the color photoresist layer;
where, the color photoresist layer includes three types of a first color filter, a second color filter and a third color filter in different heights.

The support pillar includes:
a main support pillar, disposed on the first color filter;
a first auxiliary support pillar, disposed on the second color filter; a second auxiliary support pillar, disposed on the third color filter;
a height difference between the main support pillar 31 and the first auxiliary support pillar 32 is a first section difference D1;
a height difference between the main support pillar 31 and the second auxiliary support pillar 33 is a second section difference D2; and
the first section difference D1 is the same as the second section difference D2.

The color photoresist layer is formed the substrate, a pixel of the substrate is more clear, a color display degree is better, and the support pillar is formed on the color photoresist layer, so a gap between the substrates is maintained.

Figure 6:
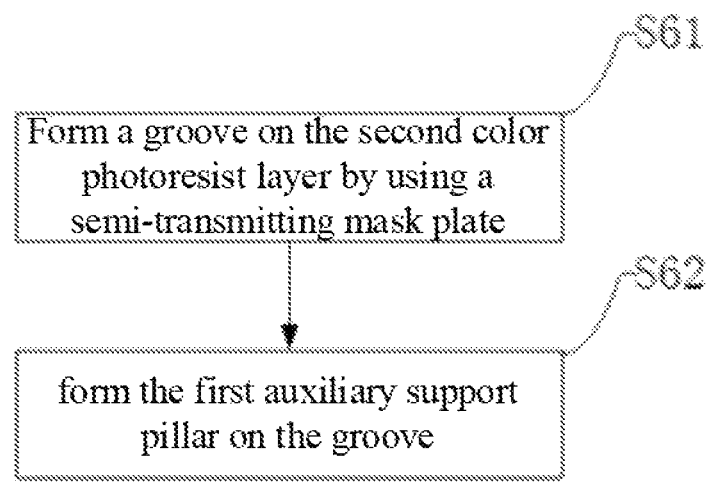
FIG. 6 is a schematic diagram of a color photoresist layer method step of one embodiment of the present application.
Figure 7:
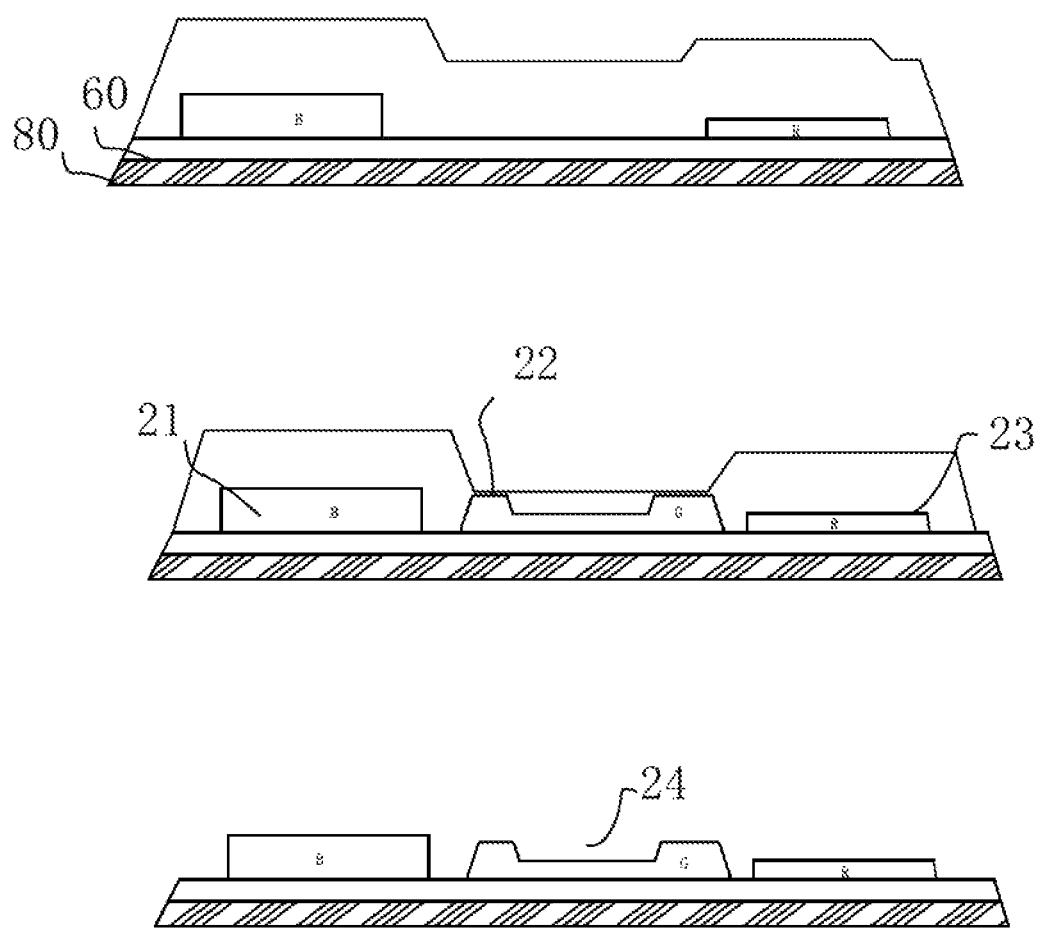
FIG. 7 is a schematic diagram of a groove method step of one embodiment of the present application.

Reference to FIG. 6 to FIG. 7, optionally in the embodiment, the step of forming the color photoresist layer on the substrate includes the following steps:

S61: forming a groove on the second color photoresist layer by using a semi-transmitting mask plate;
optionally in the embodiment, the step of forming the support pillar on the color photoresist layer includes the following steps:

S62: forming the first auxiliary support pillar on the groove.

A diffraction principle of a semi-transparent film or a graphic slit on the mark plate to ultraviolet light is adopted for reducing a local ultraviolet transmittance, the transmittance of a second color filter area is reduced, and a practical film thickness of the second color filter area is slightly decreased compared with a complete transmitting area, and through the adjustment of manufacturing process parameters, the same section difference may be realized.

Figure 8:
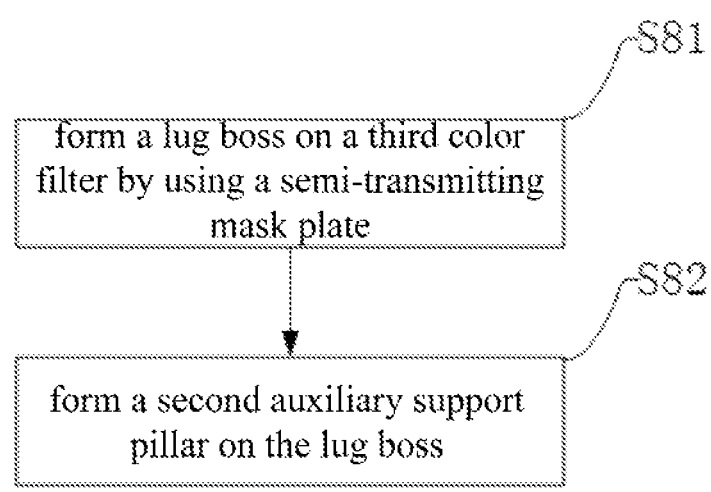
FIG. 8 is a schematic diagram of a lug boss method step of one embodiment of the present application.

Reference to FIG. 8, optionally in the embodiment, the step of forming the color photoresist layer on the substrate includes the following steps:

S81: form a lug boss on a third color filter by using a semi-transmitting mask plate;
the step of forming the support pillar on the color photoresist layer includes the following steps:

S82: form a second auxiliary support pillar on the lug boss.

The diffraction principle of the semi-transparent film or the graphic slit on the mark plate to the ultraviolet light is adopted for reducing the local ultraviolet transmittance, the transmittance of a third color filter area is reduced, and the practical film thickness of third color filter area is slightly decreased compared with the complete transmitting area, and through the adjustment of the manufacturing process parameters, the same section difference may be realized.

Figure 9:
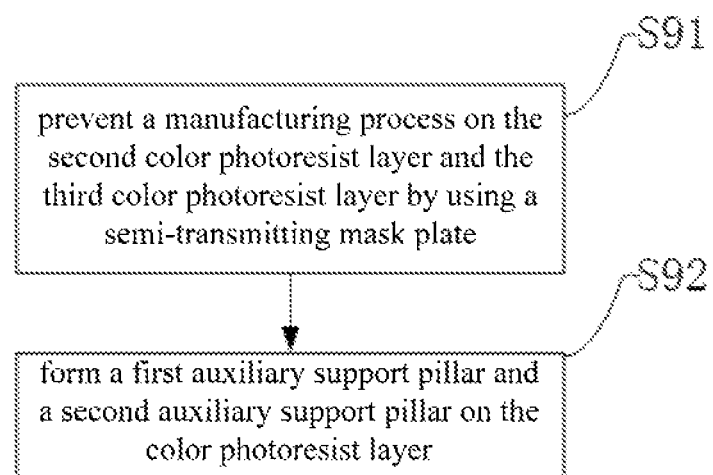
FIG. 9 is a schematic diagram of a support pillar method step of one embodiment of the present application.

Reference to FIG. 9, optionally in the embodiment, the step of forming the color photoresist layer on the substrate includes the following steps:

S91: form a second color filter and a third color filter with smooth surfaces by using a full-transmitting mask plate;
the step of forming the support pillar on the color photoresist layer includes the following steps:

S92: form a first auxiliary support pillar and a second auxiliary support pillar on the second color filter and the third color filter.

The diffraction principle of the semi-transparent film or the graphic slit on the mark plate to the ultraviolet light is adopted for reducing the local ultraviolet transmittance, the transmittances of a second color filter area and a third color filter area are reduced, and the practical film thicknesses of the second color filter area and the third color filter area are slightly decreased compared with the complete transmitting area, and through the adjustment of the manufacturing process parameters, the same section difference may be realized.

The panel of the present application may be a Twisted Nematic (TN for short) panel, an In-PaneSwitching (IPS) panel and a Multi-domain Vertical Alignment (VA for short, namely a multi-domain vertical alignment technology) panel, certainly, the panel may also be other types of the panels, and available only if the panel is suitable.

The above content is the optional detailed description to the present application in combination with the specific optional mode of execution, and the specific implementation of the present application may not be designated to be limited to these descriptions. A plurality of simple deduction or replacement to the present application may also be made by those of ordinary skill in the art under the precondition without departing from a conception of the present application, and should be considered to fall within a scope of protection of the present application.

What is claimed is:
1. A display panel, comprising:
a substrate;
a color photoresist layer, formed on the substrate, wherein the color photoresist layer comprises three types of parallelly disposed first color filter, second color filter and third color filter in different heights;
a support pillar, wherein the support pillar is disposed on the color photoresist layer;
the support pillar comprises:
a main support pillar, wherein the main support pillar is disposed on the first color filter;
a first auxiliary support pillar, disposed on the second color filter; a second auxiliary support pillar, disposed on the third color filter;
a height difference between the main support pillar and the first auxiliary support pillar is a first section difference; and
a height difference between the main support pillar and the second auxiliary support pillar is a second section difference;
wherein the first section difference is the same as the second section difference;
wherein the third color filter is provided with a lug boss, the second auxiliary support pillar is disposed on the lug boss, and a height of the second auxiliary support pillar is the same as a height of the first auxiliary support pillar.
2. The display panel according to claim 1, wherein the substrate comprises a substratum.

3. The display panel according to claim 1, wherein the first color filter is a blue filter, the second color filter is a green filter, and the third color filter is a red filter.

4. The display panel according to claim 1, wherein the lug boss surface is a plane.

5. The display panel according to claim 1, wherein the substrate further comprises:
a substratum;
a black matrix layer, formed on the substratum, wherein the color photoresist layer is formed on the black matrix layer; and
a transparent electrode layer, configured to cover the support pillar and the color photoresist layer.

6. A manufacturing method for a the display panel as recited in claim 1, the manufacturing method comprising the following steps:
forming a color photoresist layer on a substrate;
forming a support pillar on the color photoresist layer;
wherein, the color photoresist layer comprises three types of parallelly disposed first color filter, second color filter and third color filter in different heights;
the support pillar comprises:
a main support pillar, disposed on the first color filter;
a first auxiliary support pillar, disposed on the second color filter; a second auxiliary support pillar, disposed on the third color filter;
a height difference between the main support pillar and the first auxiliary support pillar is a first section difference;
a height difference between the main support pillar and the second auxiliary support pillar is a second section difference; and
the first section difference is the same as the second section difference;
wherein the step of forming the color photoresist layer on the substrate comprises the following steps:
forming a lug boss on a third color filter by using a semi-transmitting mask plate;
the step of forming the support pillar on the color photoresist layer comprises the following steps:
forming the second auxiliary support pillar on the lug boss.

7. A display device, comprising a display panel, the display panel comprises:
a substratum;
a black matrix layer, formed on the substratum;
a color photoresist layer, formed on the substratum, wherein the color photoresist layer comprises three types of a first color filter, a second color filter and a third color filter in different heights;
a support pillar, wherein the support pillar is disposed on the color photoresist layer;
a transparent electrode layer, configured to cover the support pillar and the color photoresist layer;
the support pillar comprises:
a main support pillar, wherein the main support pillar is disposed on the first color filter;
a first auxiliary support pillar, disposed on the second color filter; a second auxiliary support pillar, disposed on the third color filter;
a height difference between the main support pillar and the first auxiliary support pillar is a first section difference;
a height difference between the main support pillar and the second auxiliary support pillar is a second section difference;
the first section difference is the same as the second section difference;
wherein the second color filter is provided with a groove, and the first auxiliary support pillar is disposed in the groove; and a height of the first auxiliary support pillar is the same as a height of the second auxiliary support pillar.

8. The display device according to claim 7, wherein the third color filter is provided with a lug boss, the second auxiliary support pillar is disposed on the lug boss, and the height of the second auxiliary support pillar is the same as the height of the first auxiliary support pillar.

9. The display device according to claim 7, wherein the shape of the groove is an isosceles trapezoid shape.

10. A display panel, comprising:
a substrate;
a color photoresist layer, formed on the substrate, wherein the color photoresist layer comprises three types of parallelly disposed first color filter, second color filter and third color filter in different heights;
a support pillar, wherein the support pillar is disposed on the color photoresist layer;
the support pillar comprises:
a main support pillar, wherein the main support pillar is disposed on the first color filter;
a first auxiliary support pillar, disposed on the second color filter; a second auxiliary support pillar, disposed on the third color filter;
a height difference between the main support pillar and the first auxiliary support pillar is a first section difference; and
a height difference between the main support pillar and the second auxiliary support pillar is a second section difference;
wherein the first section difference is the same as the second section difference;
wherein the second color filter is provided with a groove, the first auxiliary support pillar is disposed in the groove, and the height of the first auxiliary support pillar is the same as the height of the second auxiliary support pillar.

11. A manufacturing method for the display panel as recited in claim 10, the manufacturing method comprising the following steps:
forming a color photoresist layer on a substrate;
forming a support pillar on the color photoresist layer;
wherein, the color photoresist layer comprises three types of parallelly disposed first color filter, second color filter and third color filter in different heights;
the support pillar comprises:
a main support pillar, disposed on the first color filter;
a first auxiliary support pillar, disposed on the second color filter; a second auxiliary support pillar, disposed on the third color filter;
a height difference between the main support pillar and the first auxiliary support pillar is a first section difference;
a height difference between the main support pillar and the second auxiliary support pillar is a second section difference; and
the first section difference is the same as the second section difference;
wherein the step of forming the color photoresist layer on the substrate comprises the following steps:
forming a groove on the second color photoresist layer by using a semi-transmitting mask plate;

the step of forming the support pillar on the color photoresist layer comprises the following steps:
forming the first auxiliary support pillar on the groove.

\* \* \* \* \*